US011695484B2

(12) United States Patent
Orsini et al.

(10) Patent No.: US 11,695,484 B2
(45) Date of Patent: Jul. 4, 2023

(54) PAIRING ELECTRONIC DEVICES THROUGH AN ACCESSORY DEVICE

(71) Applicant: Cisco Technology, Inc., San Jose, CA (US)

(72) Inventors: Catelyn G. Orsini, Santa Cruz, CA (US); Vikas Vashisht, Morrisville, NC (US); Alberto J. Montilla Bravo, Allen, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 283 days.

(21) Appl. No.: 17/081,503

(22) Filed: Oct. 27, 2020

(65) Prior Publication Data

US 2022/0131621 A1 Apr. 28, 2022

(51) Int. Cl.
*H04B 11/00* (2006.01)
*H04R 1/10* (2006.01)

(52) U.S. Cl.
CPC ............... *H04B 11/00* (2013.01); *H04R 1/10* (2013.01)

(58) Field of Classification Search
CPC ....... H04R 1/10; H04R 2420/07; H04B 11/00
See application file for complete search history.

(56) References Cited

U.S. PATENT DOCUMENTS

| | | | |
|---|---|---|---|
| 9,225,937 B2 | 12/2015 | Sun et al. | |
| 9,730,255 B1 | 8/2017 | Chu et al. | |
| 10,003,377 B1 | 6/2018 | Ramalho et al. | |
| 10,141,973 B1 | 11/2018 | Ramalho et al. | |
| 10,530,417 B2 | 1/2020 | Ramalho et al. | |
| 2010/0235285 A1* | 9/2010 | Hoffberg | G06Q 20/308 705/37 |
| 2014/0140552 A1* | 5/2014 | Hui | G08G 1/0965 381/309 |
| 2014/0241540 A1* | 8/2014 | Hodges | H04M 1/6066 381/74 |
| 2015/0109404 A1 | 4/2015 | Sun et al. | |
| 2016/0212103 A1* | 7/2016 | Rhoads | H04L 63/0869 |
| 2016/0219358 A1* | 7/2016 | Shaffer | H04R 1/1016 |
| 2016/0337747 A1* | 11/2016 | Litovsky | H04R 1/2838 |
| 2017/0024723 A1* | 1/2017 | Filler | G06Q 20/36 |
| 2018/0313937 A1* | 11/2018 | Dai | G01S 5/16 |
| 2019/0069070 A1* | 2/2019 | Patil | H04R 1/2857 |
| 2019/0125361 A1* | 5/2019 | Shelton, IV | A61B 90/30 |

(Continued)

OTHER PUBLICATIONS

SonoQue, "C5 Portable Wireless Convex Transducer Ultrasound", 9 pages, retrieved from Internet Oct. 27, 2020; https://www.sonoque.com/...DkARIsAJcfmTGB_EK3WM1xFspw6YcpSEYIufG56i0f_wyXWOMq6gAj1cCiaFP4Sm4aAuxDEALw_wcB.

(Continued)

*Primary Examiner* — Daniel L Murphy
*Assistant Examiner* — Amie M Ndure
(74) *Attorney, Agent, or Firm* — Edell, Shapiro & Finnan, LLC

(57) ABSTRACT

In one example, an accessory device establishes a connection with a first collaboration device. An acoustic signal encoded with a token and transmitted by a second collaboration device is received at the accessory device. The acoustic signal is decoded at the accessory device to obtain the token. The token is transmitted from the accessory device to the first collaboration device for verification and pairing of the first collaboration device with the second collaboration device.

20 Claims, 11 Drawing Sheets

(56) References Cited

U.S. PATENT DOCUMENTS

| | | | |
|---|---|---|---|
| 2019/0158948 A1* | 5/2019 | Miller | H04R 1/028 |
| 2019/0245840 A1* | 8/2019 | Chen | H04W 12/08 |
| 2019/0265017 A1 | 8/2019 | Guo et al. | |
| 2019/0327225 A1* | 10/2019 | Wahlberg | H04L 9/3228 |
| 2019/0373217 A1 | 12/2019 | Chu et al. | |
| 2020/0137130 A1 | 4/2020 | Griffin et al. | |
| 2020/0195297 A1 | 6/2020 | Ramalho et al. | |
| 2021/0345036 A1* | 11/2021 | Van Hook | H04R 1/38 |
| 2022/0038819 A1* | 2/2022 | Dusan | H04R 1/1091 |

OTHER PUBLICATIONS

Lorenzo Spreafico et al., "UltraFit: A speaker-friendly headset for ultrasound recordings in speech science", Interspeech 2018, Sep. 2018, 4 pages.

Patently Apple, "Apple Invents Magnetic Sensor Proximity Sensing for Accurate 3D Fingertip Controllers for Mixed Reality Headset", 14 pages, retrieved from Internet Oct. 27, 2020; https://www.patentlyapple.com/patently-apple/2019/08/apple-invents-magnetic-sensor-proximity-sensing-for-accurate-3d-fingertip-controllers-for-mixed-reality-headset.html.

Marc S. Lemchen, "Sound protecting headset with proximity collision avoidance protection", ResearchGate GmbH, The Journal of the Acoustical Society of America, 120(3), DOI: 10.1121/1.2355965, Jan. 2006, 6 pages.

jeremylaurenson, "Cisco 730 Headset", Feb. 21, 2020, 17 pages; https://jeremylaurenson.wordpress.com/2020/02/21/cisco-730-headset/.

* cited by examiner

PAIRING ELECTRONIC DEVICES THROUGH AN ACCESSORY DEVICE

TECHNICAL FIELD

The present disclosure relates to pairing electronic devices for a collaboration session.

BACKGROUND

Collaboration devices may support ultrasound-based proximity for zero touch pairing. This pairing is based on spread spectrum acoustic communication techniques in which a collaboration device transmits a token. The token is a sequence of bits encoded in an ultrasound signal that is used to identify other collaboration devices in proximity to the transmitting collaboration device. The ultrasound signal with the token is transmitted via audio speakers of the collaboration device. Another collaboration device, such as a laptop, personal computer (PC), and mobile device, listens to all microphone inputs, and decodes the transmitted signal to obtain the token. The token is provided to collaboration cloud services and, upon validation, permission is granted for the other collaboration device to pair with the transmitting collaboration device. However, this pairing may be inoperable when a headset or other accessory (e.g., a portable speakerphone, etc.) is already connected to, or paired with, the other collaboration device.

DESCRIPTION OF EXAMPLE EMBODIMENTS

Overview

Figure 1:
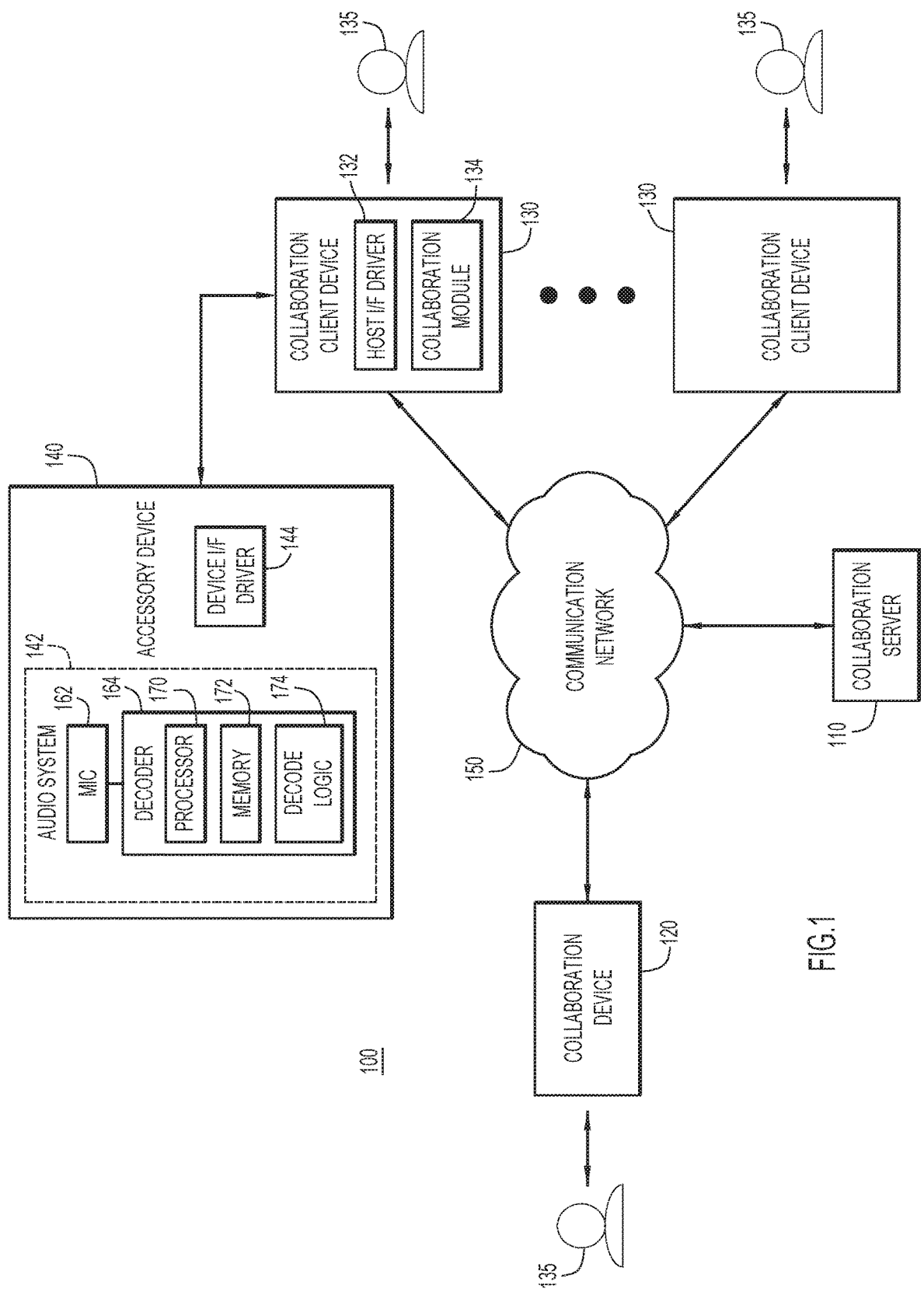
FIG. 1 illustrates a block diagram of a system configured for pairing collaboration devices through an accessory device, according to an example embodiment.

In one example embodiment, an accessory device establishes a connection with a first collaboration device. An acoustic signal encoded with a token and transmitted by a second collaboration device is received at the accessory device. The acoustic signal is decoded at the accessory device to obtain the token. The token is transmitted from the accessory device to the first collaboration device for verification and pairing of the first collaboration device with the second collaboration device.

Example Embodiments

Collaboration devices may support ultrasound-based proximity for zero touch pairing. This pairing is based on spread spectrum acoustic communication techniques in which a collaboration device transmits a rotating token. The token is a sequence of bits (e.g., including data bits and one or more cyclic redundancy check (CRC) bits) encoded in an ultrasound signal that is used to identify other collaboration devices in proximity to the transmitting collaboration device. The ultrasound signal with the token is transmitted on a constant basis via audio speakers of the transmitting collaboration device. Another collaboration device, such as a laptop, personal computer (PC), and mobile device, listens to all microphone inputs, records approximately 150 milliseconds of audio in a circular buffer, and decodes the transmitted signal to obtain the token. The token is provided to collaboration cloud services and, upon validation, a permission token is communicated to the other collaboration device for a fixed duration of time (e.g., two minutes, etc.) that grants permission for the other collaboration device to pair with the transmitting collaboration device.

Pairing allows the other collaboration device to use and control resources of the transmitting collaboration device to perform actions, such as join meetings with video, share content, or simply start a telephone call. This type of pairing is advantageous since the pairing is based on standard interfaces, such as microphones and speakers that are present in virtually any user communications equipment (e.g., laptops, mobile phones, etc.).

However, this type of pairing may be inoperable when a headset or other accessory (e.g., a portable speakerphone, etc.) is already connected to, or paired with, the other collaboration device. For example, some collaboration systems block ultrasound pairing or have blacklisted Bluetooth® (BT) devices (depending on a device operating system (OS)). The reasons for this include: 1) existing BT device voice codecs (coder/decoder) have a sampling rate of only 16 kilohertz (kHz) and cannot transmit the ultrasound frequencies to the client device; and 2) BT audio devices that are streaming music either from the other collaboration device or another audio gateway are interrupted when the device microphone is opened to detect the ultrasound signal.

Although a specialized always-on microphone with an active Bluetooth (BT) media channel, proper data rate, and 48 kilohertz (kHz) sampling in the headset or other accessory may address the issues, there are several disadvantages. For example, the specialized microphone in the headset or other accessory would capture the ultrasound signal in order for the accessory to relay the ultrasound signal to the other collaboration device for processing. However, not all devices support data with the sampling rate of 48 kilohertz (kHz), and always-on media have a significant adverse effect on battery life. In addition, the headset or other accessory is unavailable for use with any other application or device. For example, a user is unable to listen to music since the accessory is busy for ultrasound detection.

Accordingly, a present embodiment performs ultrasound pairing of a collaboration client device with a collaboration device through an accessory device (e.g., headsets, personal speakerphone, etc.) of the collaboration client device. This enables users to successfully move, and pair a collaboration client device (e.g., laptops, mobile phones, etc.) with the collaboration device when the collaboration client device is already connected to, or paired with, the accessory device. This enhances office and other mobility scenarios where ultrasound proximity-based pairing simply does not work when the collaboration client device is already connected to or paired with the accessory device.

In an example embodiment, ultrasound pairing of a collaboration client device with a collaboration device is performed though an audio or other accessory device (e.g., Bluetooth (BT)/Universal Serial Bus (USB) headsets, personal speakerphone, etc.) of the collaboration client device. This is accomplished by decoding the token within the ultrasound signal on the accessory device and sending a proximity token to the collaboration client device through an alternative protocol (e.g., via BT, USB or other communication medium or protocol). Thus, the accessory device sends data (e.g., the extracted proximity token) to the collaboration client device, instead of passing the ultrasound signal. With respect to a battery powered device, the accessory device may include a power efficient always-on microphone capable of detecting ultrasonic energy. In this case, when an ultrasound signal is detected, the detection wakes up an audio system on the accessory device in order to decode the signal to obtain the proximity token. The proximity token is sent to the collaboration client device (e.g., via a USB human interface device (HID) command, a BT human interface device (HID) command, etc.) in order to initiate pairing. This enables extension of ultrasound pairing capability to more office or site mobility scenarios. For example, with respect to moving from a desk to a meeting room, the collaboration client device may pair with the collaboration device in the meeting room seamlessly when the collaboration client device is already connected to, or paired with, an accessory device (e.g., a headset or other accessory device).

FIG. 1 illustrates a block diagram of an example system 100 configured to pair collaboration devices for a collaboration session. For example, the collaboration session may include a video or other conference (e.g., teleconference, video conference, collaboration, etc.). System 100 includes a collaboration server 110 and a plurality of collaboration devices. In an example embodiment, the plurality of collaboration devices includes collaboration device 120 and one or more collaboration client devices 130. In another example embodiment, collaboration device 120 is substantially similar to collaboration client device 130. Collaboration device 120 desires to pair with one or more collaboration client devices 130; however, any collaboration devices may be paired in substantially the same manner described below. For example, a collaboration client device 130 may desire to pair with another collaboration client device 130 and/or a collaboration device 120. The collaboration session is typically confined to a location or site, where collaboration device 120 and collaboration client devices 130 may, by way of example, be deployed in a shared workspace or in different rooms in a building. Moreover, collaboration device 120 and collaboration client devices 130 may move between the rooms or other areas of the location over time.

Collaboration server 110 is configured to establish collaboration sessions over a communication network 150 with a group of two or more collaboration devices selected from collaboration device 120 and collaboration client devices 130. Communication network 150 may include one or more wide area networks (WANs), such as the Internet, and one or more local area networks (LANs). The collaboration server 110 may be configured to coordinate the routing of information streams (e.g., audio, video, etc.) among collaboration device 120 and collaboration client devices 130, and may reside within communication network 150 in a cloud environment. For example, collaboration server 110 may receive and distribute information streams for the collaboration session, or direct communication channels may be established between paired devices participating in the collaboration session.

Collaboration client devices 130 may be connected to an accessory device 140 (e.g., headset, audio accessory, etc.) that exchanges audio or other information with a collaboration client device 130 for a corresponding participant/user 135 (e.g., provide/receive audio/video output, etc.). The accessory device may be connected with the collaboration client device by establishing a wired or wireless connection or communication path between the accessory device and collaboration client device for exchange of information (e.g., Bluetooth (BT) pairing or other wireless communication medium/protocol, Universal Serial Bus (USB) or other wired communication medium/protocol, etc.). The accessory device may be any device with a microphone or other audio sensing device to detect ultrasound signals. In this case, accessory device 140 may detect and process ultrasound signals from collaboration device 120 for pairing of a corresponding collaboration client device 130 for a collaboration session. In an example embodiment, accessory device 140 includes an audio system 142 and a device interface driver 144. In an example, audio system 142 includes a microphone 162 or other audio sensing device and a decoder 164. Audio system 142 is preferably a separately controlled system within accessory device 140 and may be implemented as a separate dedicated system with corresponding components. This enables the operation of the audio system (e.g., microphone 162 and decoder 164) to be controlled separately from activity on device interface driver 144 in order to conserve power, especially for portable or battery operated devices. Alternatively, any of the operations of audio system 142 may be performed by accessory device components.

In an example, microphone 162 preferably includes an always-on (or continuous sensing) microphone with low power processing to detect ultrasound energy. The microphone input may be the same or separate from the microphone input of accessory device 140 used for voice and/or active noise cancellation.

In another example, microphone 162 may enable decoder 164 (and/or other audio system components) from a sleep state in response to detection of ultrasound energy. Microphone 162 may include a digital Micro-Electro-Mechanical Systems (MEMS) microphone. A main system on a chip (SoC) may be in a deep sleep state and the microphone sends an interrupt to the SoC when an ultrasound signal is detected to switch the clock signal to a high performance mode. In addition, the MEMS microphone has an increased response to high frequencies due to the resonance of the membrane, and may be boosted in a frequency range of 20-80 kilohertz (kHz) specifically for ultrasound applications. In an example embodiment, audio system 142 may be implemented as a separate system on the accessory device, such as a system on a chip (SoC).

In yet another example, audio from microphone 162 may be spooled or stored for corresponding time intervals, where decoder 164 (and/or other audio system components) may wake up periodically (e.g., upon expiration of a time interval, etc.) to process the spooled audio (e.g., spooled/stored during the expired time interval, up to the point of awakening, etc.) based on the accessory device waking up to stay connected (e.g., for Bluetooth (BT) connections, etc.). The time intervals may be for any desired durations (e.g., microseconds, milliseconds, seconds, minutes, etc.).

In still another example, a user may manually trigger the listening process of microphone 162 for detecting the ultrasound signal (e.g., by the touch of a button, a voice command, etc.).

In an example embodiment, decoder 164 may include at least one hardware processor 170 and one or more memories 172. Processor 170 may include a collection of microcontrollers and/or microprocessors, for example, each configured to execute respective software instructions stored in the memory 172. In various embodiments, decode logic 174 can include instructions that, when executed, cause processor(s) 170 to perform operations, which can include, but not be limited to, providing overall control operations of decoder 164; interacting with other entities, systems, etc. described herein; maintaining and/or interacting with stored data, information, parameters, etc. (e.g., memory element(s), storage, data structures, databases, tables, etc.); combinations thereof; and/or the like to facilitate decoding and various other operations described herein.

Decoder 164 extracts and decodes a token from an ultrasound or other signal transmitted by collaboration device 120 and captured by microphone 162 (e.g., demodulation, spread spectrum or other decoding, etc.), and passes the extracted token to a collaboration client device 130 via device interface driver 144 using a specialized or other message that depends on the specific interface or connection used (e.g. Bluetooth (BT), Universal Serial Bus (USB), Near Field Communication (NFC), or other wired or wireless communication medium/protocol). The token may be passed using any desired command compatible with the connection (e.g., a USB human interface device (HID) command, a BT human interface device (HID) command, etc.). Accordingly, the accessory device preferably passes data (e.g., the extracted token, etc.) to the collaboration client device, instead of passing the ultrasound signal. The connection or communication path may be the same connection used to connect the accessory device to the collaboration client device. Alternatively, a different connection may be used to pass the extracted token that may be any wired or wireless communication medium/protocol, and preferably out of band (to not interfere) with the communication channel for media. The device interface driver may be implemented by any conventional or other driver for providing information over a communication medium/protocol.

In an example embodiment, collaboration client devices 130 include a host interface driver 132 and a collaboration module 134. Host interface driver 132 receives the token from accessory device 140 over the connection or communication path (e.g. Bluetooth (BT), Universal Serial Bus (USB), Near Field Communication (NFC), or other wired or wireless communication medium/protocol). The connection or communication path may be the same connection used to connect the accessory device to the collaboration client device. Alternatively, a different connection may be used to pass the extracted token that may be any wired or wireless communication medium/protocol, and preferably out of band (to not interfere) with the communication channel for media.

Collaboration module 134 communicates the token over communication network 150 to collaboration server 110 in order to pair with collaboration device 120, and conducts the collaboration session through the collaboration server. In a transmit direction during the collaboration session, collaboration client devices 130 capture audio/video from their local participants 135, encode the captured audio/video into data packets, and transmit the data packets for distribution to collaboration device 120 and other collaboration client devices 130. In a receive direction during the collaboration session, collaboration client devices 130 decode audio/video from data packets from the collaboration session and present the audio/video to their local participants 135. The data packets distributed during the collaboration session may be received from collaboration device 120 and collaboration client devices 130. Collaboration device 120 and collaboration client devices 130 may be wired or wireless communication devices, such as, but not limited to laptop and tablet computers, smartphones, dedicated video conference endpoints, etc. and the like.

Collaboration device 120 and collaboration client device 130 are paired in accordance with a validation by collaboration server 110 based on the provided token. Collaboration devices may be considered paired when the collaboration devices are validated or authenticated for association with one another. Pairing allows the collaboration client device to use and control resources of the collaboration device to perform actions, such as join meetings with video, share content, or simply start a telephone call.

Figure 2:
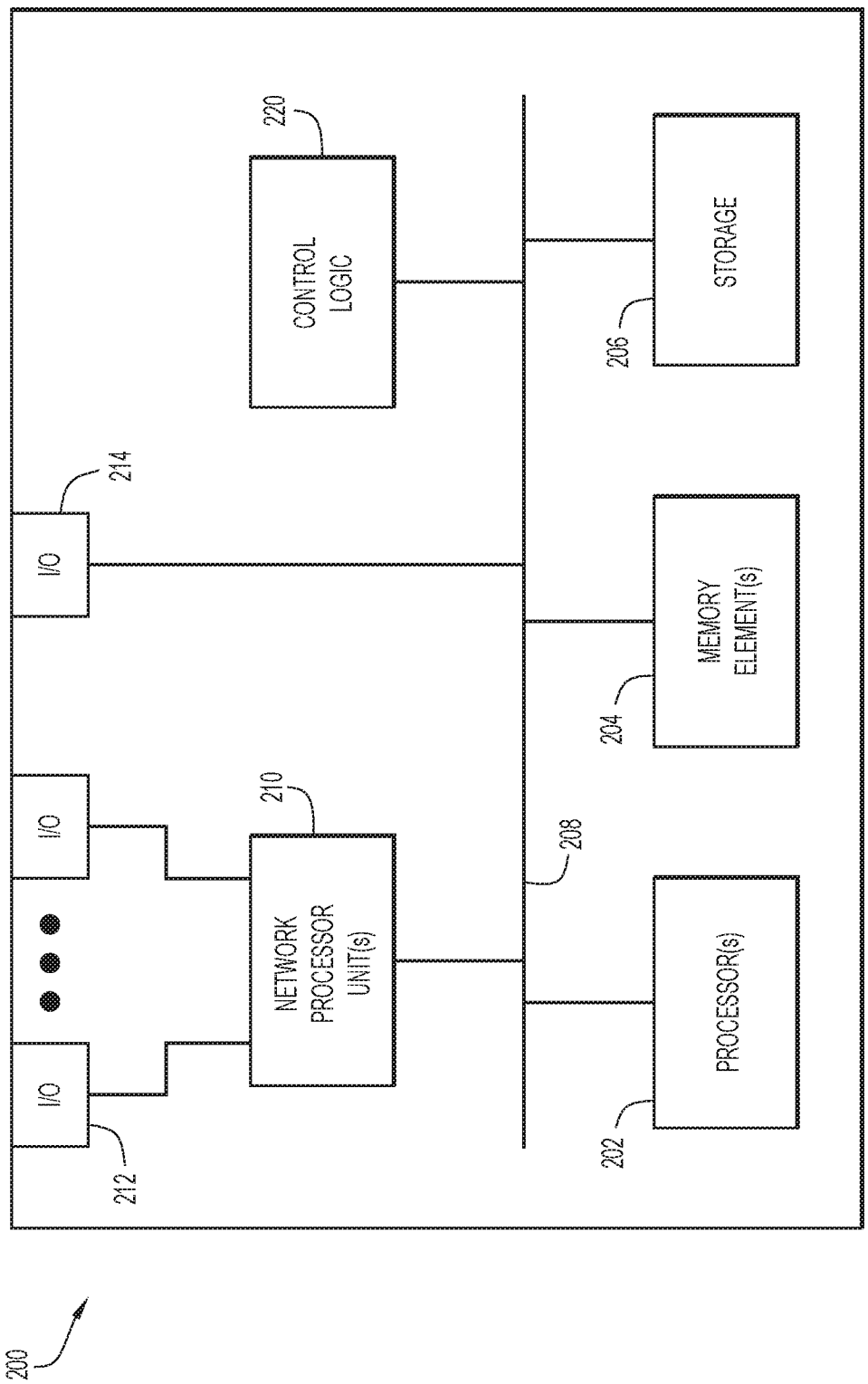
FIG. 2 illustrates a block diagram of a computing device that may be used for performing operations of the collaboration server, according to an example embodiment.

Referring to FIG. 2, FIG. 2 illustrates a hardware block diagram of a computing device 200. In various embodiments, a computing device, such as computing device 200 or any combination of computing devices 200, may be configured to implement, or perform operations of, collaboration server 110 and/or any other entity/entities to perform operations of the various techniques discussed herein.

In at least one embodiment, computing device 200 may include one or more processor(s) 202, one or more memory element(s) 204, storage 206, a bus 208, one or more network processor unit(s) 210 interconnected with one or more network input/output (I/O) interface(s) 212, one or more I/O interface(s) 214, and control logic 220. In various embodiments, instructions associated with logic for computing device 200 can overlap in any manner and are not limited to the specific allocation of instructions and/or operations described herein.

In at least one embodiment, processor(s) 202 is/are at least one hardware processor configured to execute various tasks, operations and/or functions for computing device 200 as described herein according to software and/or instructions configured for the computing device. Processor(s) 202 (e.g., a hardware processor) can execute any type of instructions associated with data to achieve the operations detailed herein. In one example, processor(s) 202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 204 and/or storage 206 is/are configured to store data, information, software, and/or instructions associated with computing device 200, and/or logic configured for memory element(s) 204 and/or storage 206. For example, any logic described herein (e.g., control logic 220) can, in various embodiments, be stored for computing device 200 using any combination of memory element(s) 204 and/or storage 206. Note that in some embodiments, storage 206 can be consolidated with memory element(s) 204 (or vice versa), or can overlap/exist in any other suitable manner.

In at least one embodiment, bus 208 can be configured as an interface that enables one or more elements of computing device 200 to communicate in order to exchange information and/or data. Bus 208 can be implemented with any architecture designed for passing control, data and/or information between processors, memory elements/storage, peripheral devices, and/or any other hardware and/or software components that may be configured for computing device 200. In at least one embodiment, bus 208 may be implemented as a fast kernel-hosted interconnect, potentially using shared memory between processes (e.g., logic), which can enable efficient communication paths between the processes.

In various embodiments, network processor unit(s) 210 may enable communication between computing device 200 and other systems, entities, etc., via network I/O interface(s) 212 to facilitate operations discussed for various embodiments described herein. In various embodiments, network processor unit(s) 210 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 200 and other systems, entities, etc. to facilitate operations for various embodiments described herein. In various embodiments, network I/O interface(s) 212 can be configured as one or more Ethernet port(s), Fibre Channel ports, and/or any other I/O port(s) now known or hereafter developed. Thus, the network processor unit(s) 210 and/or network I/O interface(s) 212 may include suitable interfaces for receiving, transmitting, and/or otherwise communicating data and/or information in a network environment.

I/O interface(s) 214 allow for input and output of data and/or information with other entities that may be connected to computer device 200. For example, I/O interface(s) 214 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 220 can include instructions that, when executed, cause processor(s) 202 to perform operations, which can include, but not be limited to, providing overall control operations of computing device 200; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 3:
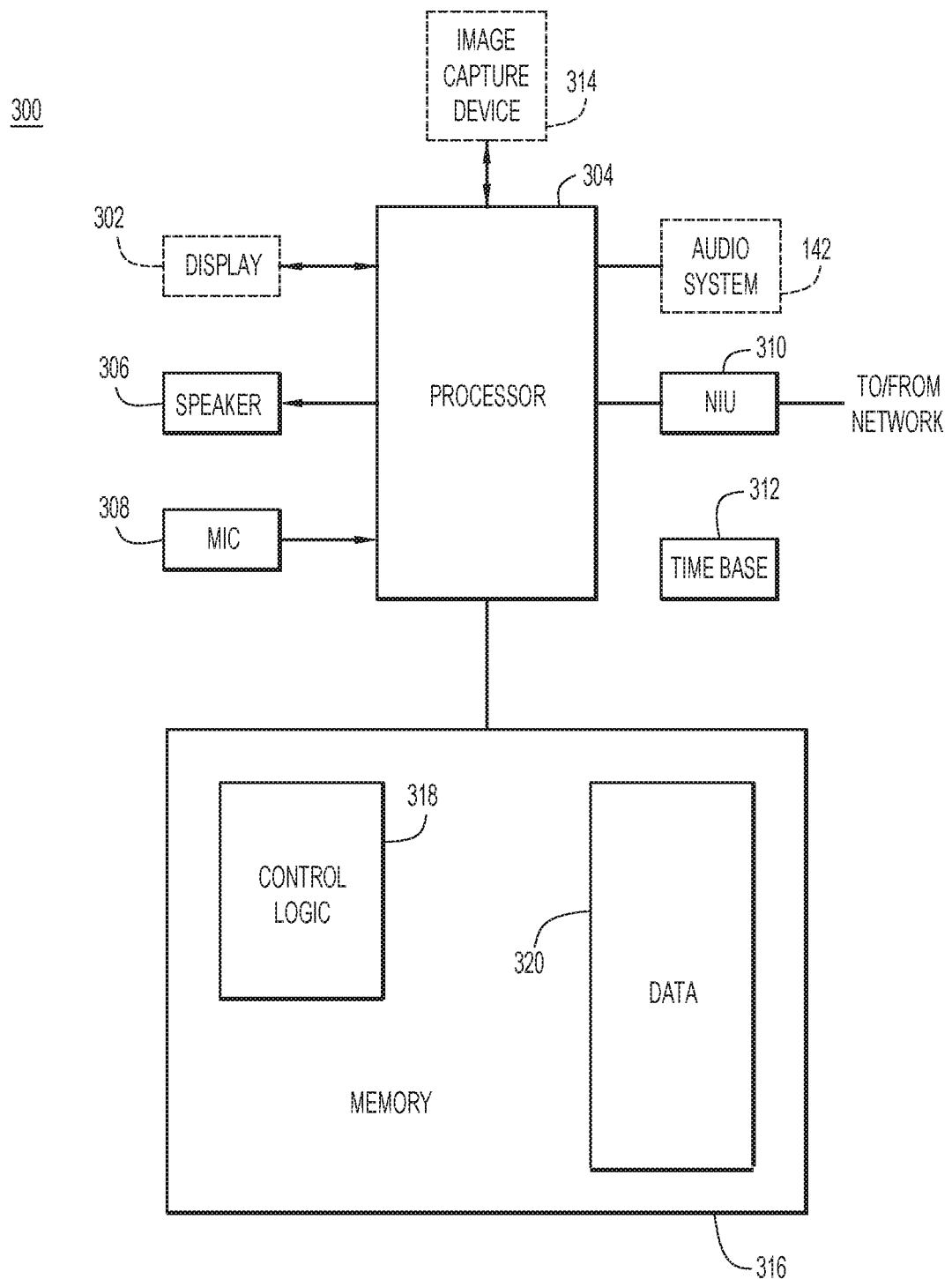
FIG. 3 illustrates a block diagram of a processing device that may be used for performing operations of the collaboration device, collaboration client device, and/or accessory device, according to an example embodiment.

With reference to FIG. 3, there is a block diagram of an example processing device 300. In an example embodiment, processing device 300 may be configured to implement, or perform operations of, collaboration device 120, collaboration client devices 130, and accessory device 140. Examples of collaboration device 120 and collaboration client devices 130 include a tablet computer, a personal computer, a laptop computer, a mobile phone, such as a smartphone, or a video conference endpoint or base station, and so on. Examples of accessory device 140 include a headset, portable speaker, or other device capable of pairing or connecting, and exchanging data, with a collaboration device (e.g., collaboration device 120, collaboration client device 130, etc.).

Processing device 300 may include an optional display 302, one or more speakers 306, one or more microphones 308, one or more network interface units (NIUs) 310, a time base 312, an optional image capture device 314 (e.g., camera to capture images and/or video, etc.), and memory 316 each coupled to a processor 304. The one or more NIUs 310 may include wired and/or wireless connection capability that allows processor 304 to communicate over a communication path or network (e.g., communication network 150, Bluetooth (BT), Near Field Communication (NFC) or other wireless communication path, Universal Serial Bus (UBS) or other wired communication path, etc.). For example, NIUs 310 may include an Ethernet card to communicate over an Ethernet connection, a wireless RF transceiver to communicate wirelessly with cellular or other networks, optical transceivers, and the like, as would be appreciated by one or ordinary skill in the relevant arts. Time base 312 may include one or more oscillators and/or clocks, and may also include a Global Positioning Systems (GPS) receiver to recover location and time, which may be used to time-synchronize multiple ones of devices. Also, time base 312 may include applications to implement time synchronization via NTP, and so on.

Processor 304 may include a collection of microcontrollers and/or microprocessors, for example, each configured to execute respective software instructions stored in the memory 316. The collection of microcontrollers may include, for example: a video controller to receive, send, and process video signals or images related to display 302 and image capture device 314; an audio processor to receive, send/transmit, and process audio/sound signals related to speaker 306 and microphone 308 as described herein; and a high-level controller to provide overall control. Portions of memory 316 (and the instructions therein) may be integrated with processor 304.

The memory 316 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 316 may comprise one or more computer readable storage media (e.g., a memory device) encoded with software comprising computer executable instructions and when the software is executed (by the processor 304) it is operable to perform the operations of collaboration device 120, collaboration client device 130, and accessory device 140 described herein. For example, the memory 316 stores or is encoded with instructions for control logic 318 to perform operations described herein related to pairing of collaboration devices through an accessory device. In addition, memory 316 stores data/information 320 used and generated by logic 318.

With respect to collaboration device 120 and collaboration client device 130, control logic 318 may include host interface driver 132, collaboration module 134, and logic for generating and decoding ultrasound signals as described below.

For accessory device 140, processing device 300 may further include, or be coupled to, audio system 142, where the audio system may be coupled to processor 304 and control logic 318 may include device interface driver 144. In an example, control logic 318 may include logic to perform any of the operations of the audio system (e.g., decoding ultrasound signals, etc.).

Figure 4:
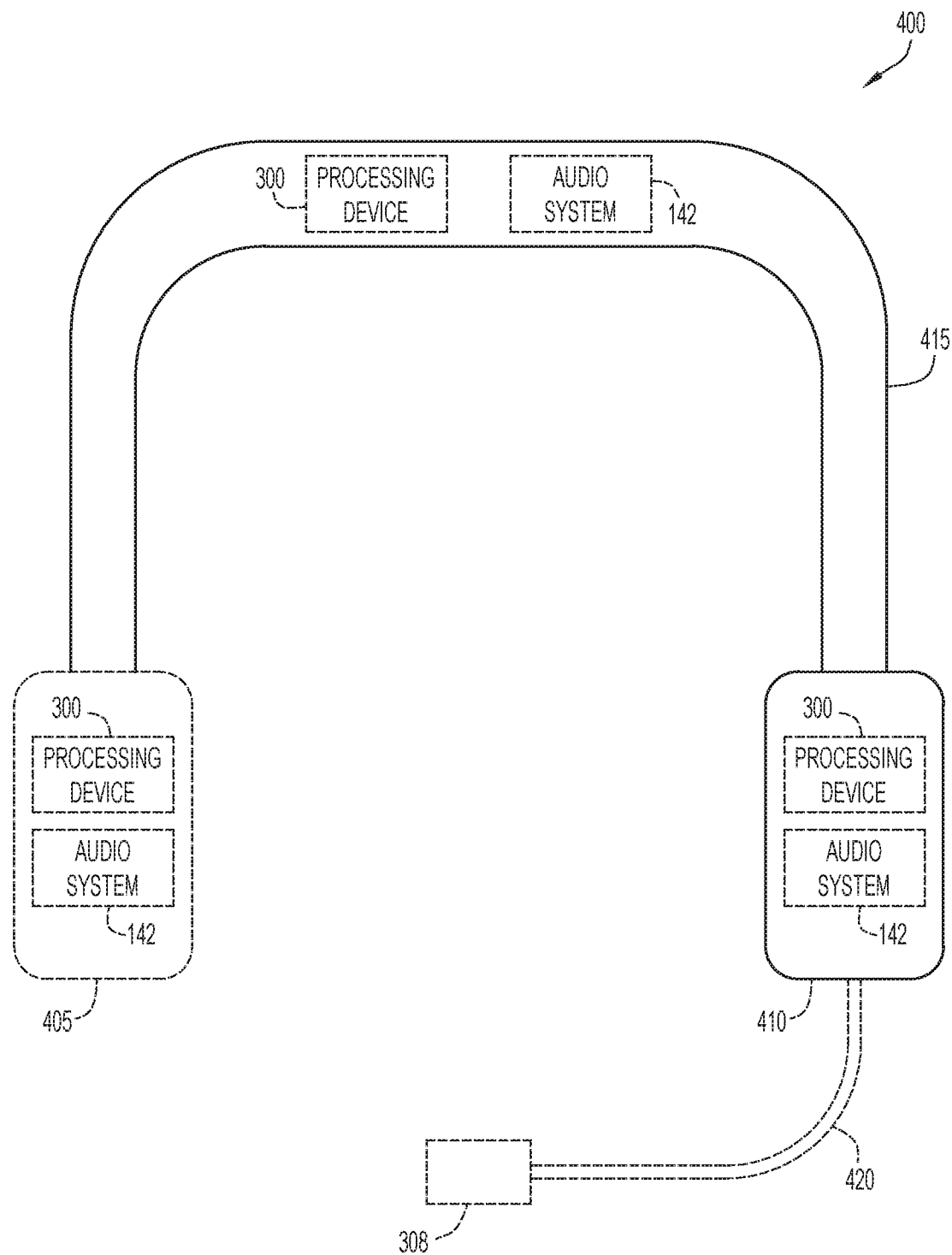
FIG. 4 illustrates a block diagram of an accessory device in the form of a headset, according to an example embodiment.

FIG. 4 illustrates an accessory device in the form of a headset, according to an example embodiment. Headset 400 includes one or more ear units, a flexible band 415, and a microphone 308 (FIG. 3). For example, headset 400 may include ear units 405, 410 disposed toward the distal ends of band 415, and may be attached to the band in a manner providing various movements (e.g., rotation, vertical or folding movement, etc.). The ear units each include a speaker 306 (FIG. 3) to provide audio to a corresponding ear of a user, and preferably a material covering, pad, or cushion to provide comfort when worn. In an example embodiment, microphone 308 is attached toward a distal end of an arm 420 extending from ear unit 410. The arm may be attached to the ear unit in a manner providing various movements (e.g., rotation, vertical or folding movement, telescoping movement, etc.). The microphone is typically positioned proximate a user mouth to receive audio or voice signals. However, arm 420 may be attached to either ear unit 405, 410 and/or band 415, while microphone 308 may alternatively be embedded within the ear units and/or flexible band.

In example operation when headset 400 is worn, band 415 is placed over a head of a user with ear units 405, 410 disposed proximate corresponding ears of a user, and microphone 308 placed proximate a user mouth. Headset 400 may include processing device 300 (FIG. 3) and audio system 142 (FIG. 1), and may connect or pair with collaboration client device 130 (e.g., via Bluetooth (BT), or other wired or wireless communication medium/protocol) and provide output from a paired device to a user through ear units 405, 410. Headset 400 may further receive input from microphone 308 for processing. Alternatively, headset 400 may operate to pair with collaboration client device 130 when the headset is not being worn (e.g., resting on a surface, being held or suspended, etc.). Processing device 300 and audio system 142 may enable pairing of collaboration devices as described below, and may be disposed at any locations on headset 400 to perform headset operations. For example, processing device 300 and audio system 142 may be disposed at the same or different locations within ear unit 405, 410, and/or band 415.

Headset 400 may include various configurations. In one example, headset 400 may include a single ear unit 405 or 410. In another example, headset 400 may be provided as headphones (e.g., without arm 420 and microphone 308). In this case, one or more microphones may be embedded within the ear units and/or flexible band. In yet another example, headset 400 may be in the form of one or more earpieces for direct insertion within user ears (e.g., without flexible band 415). The various configurations may include processing device 300 and audio system 142 disposed at any locations for performing headset operations, and enabling pairing of collaboration devices as described below.

Figure 5:
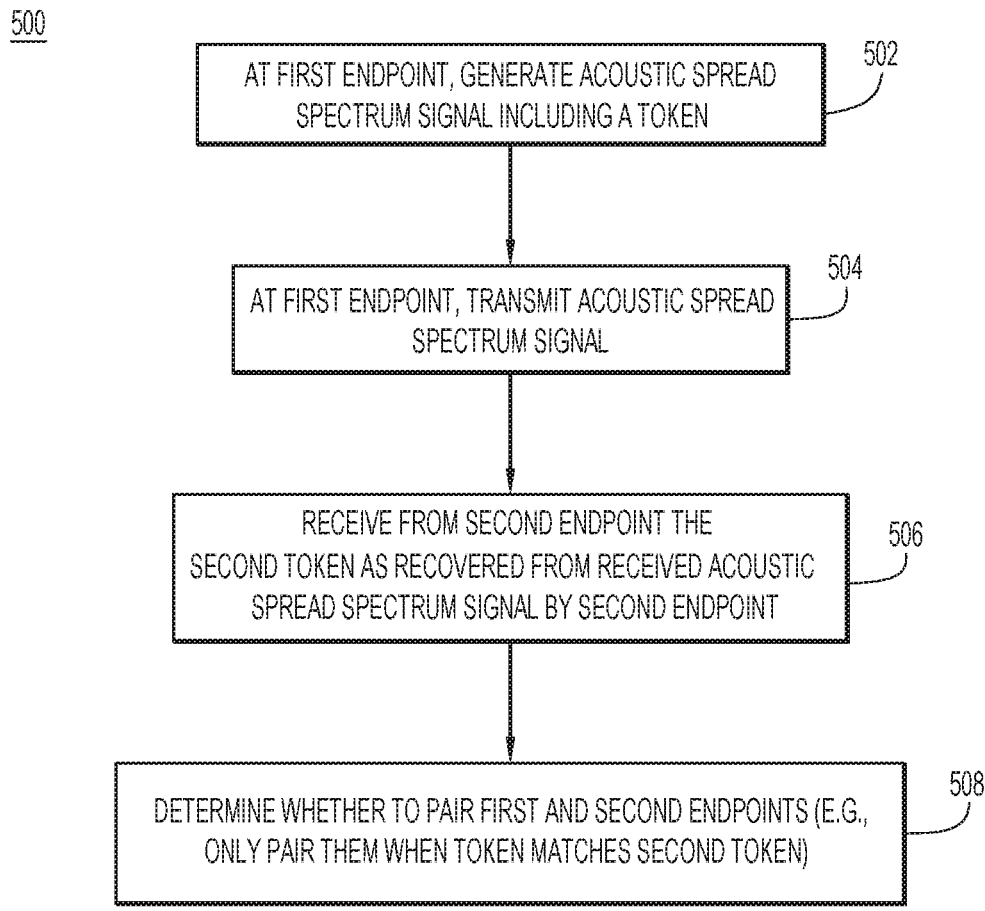
FIG. 5 is a flowchart of a method of pairing a collaboration device with a collaboration client device (without use of an accessory device), according to an example embodiment.

Collaboration devices may be directly paired (e.g., when an accessory device is not employed) using ultrasound-based proximity pairing. The ultrasound-based proximity pairing may be implemented by any conventional or other pairing techniques. With continued reference to FIG. 1, FIG. 5 illustrates a flowchart of an example method 500 for directly pairing collaboration devices using ultrasound-based proximity pairing (e.g., when an accessory device is not employed) according to an example embodiment. It will be appreciated that other components of system 100 may additionally/alternatively perform any of these operations. In the example embodiment, collaboration device 120 desires to pair with a collaboration client device 130; however, any collaboration devices may be paired in substantially the same manner described below. For example, a collaboration client device 130 may desire to pair with another collaboration client device 130 and/or a collaboration device 120.

At operation 502, collaboration device 120 serving as a first endpoint generates an acoustic spread spectrum signal including a token. The token is generated by collaboration server 110 and provided to the first endpoint over communication network 150. The token may include a sequence of bits including data bits for verification data (e.g., number or data sequence) and optional cyclic redundancy check (CRC) or other error detect/correct bits. The token may be of any type or format (e.g., numeric, alphanumeric, symbols, etc.), may include any quantity of data bits and any quantity of CRC (or other error detect/correct) bits, and typically changes over time. The spread spectrum signal may be generated from any conventional or other spread spectrum technique (e.g., Direct Sequence Spread Spectrum (DSSS), Frequency Hopping Spread Spectrum (FHSS), hybrid spread spectrum (HSS) techniques combining direct sequence, frequency hopping, and/or other techniques, etc.). For example, the spread spectrum signal representing/encoded with the token may be generated as described below with respect to FIG. 6.

At operation 504, the first endpoint transmits the acoustic spread spectrum signal. At operation 506, a collaboration client device 130 serving as a second endpoint directly receives the acoustic spread spectrum signal from the first endpoint, and transmits to collaboration server 110 over communication network 150 a second token recovered from the received acoustic spread spectrum signal. The spread spectrum signal may be decoded using any conventional or other spread spectrum decoding techniques (e.g., decoding techniques for Direct Sequence Spread Spectrum (DSSS), decoding techniques for Frequency Hopping Spread Spectrum (FHSS), decoding techniques for hybrid spread spectrum (HSS) techniques combining direct sequence, frequency hopping, and/or other techniques, etc.). For example, the spread spectrum signal may be decoded as described below with respect to FIG. 7.

At operation 508, the first endpoint device is paired with the second endpoint device when the token provided to the first endpoint matches the second token from the second endpoint. The proximity is determined by the fact that the devices were close enough such that the acoustic signal transmitted by one device was heard and detected by the other device.

Figure 6:
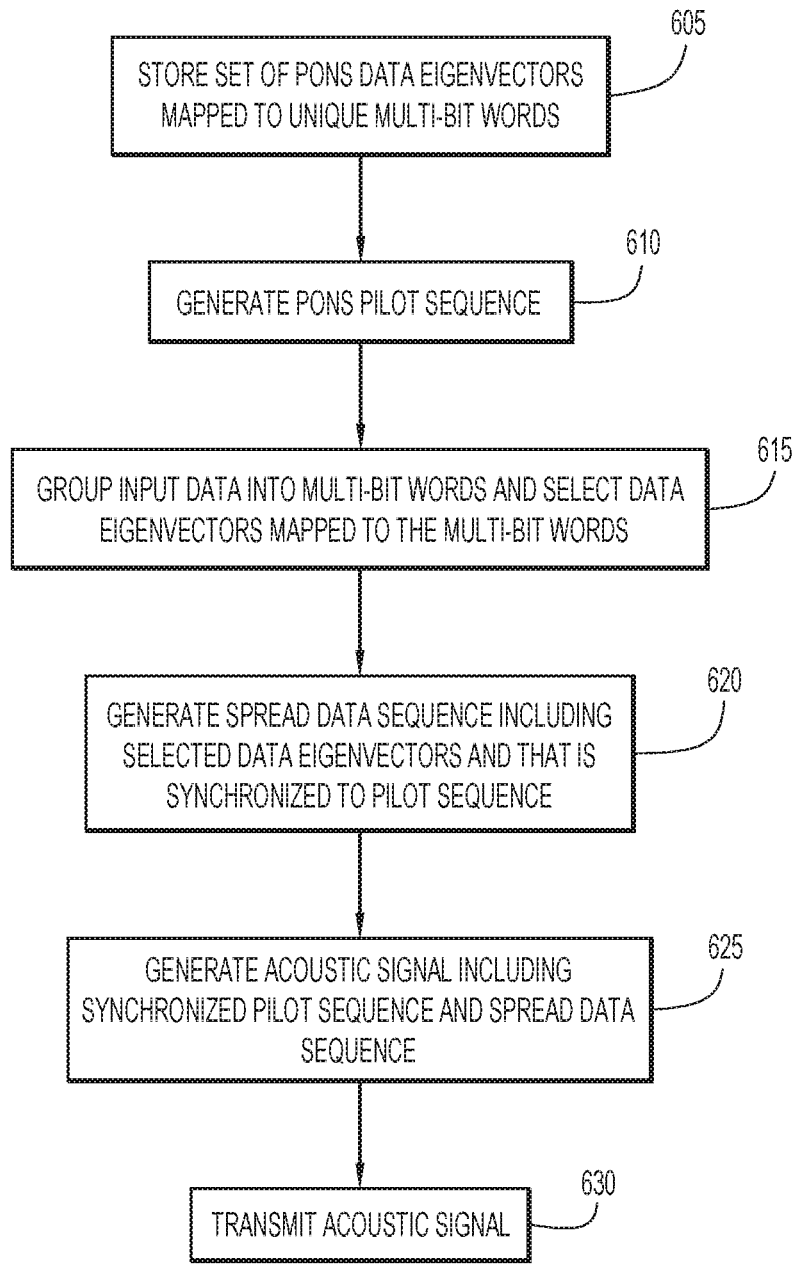
FIG. 6 is a flowchart of a method of generating a spread spectrum signal, according to an example embodiment.

With continued reference to FIG. 1, FIG. 6 illustrates a flowchart of a method 600 of generating a spread spectrum signal, according to an example embodiment. While the operations of FIG. 6 are described as being performed by collaboration device 120, it will be appreciated that other components of system 100 may additionally/alternatively perform any of these operations. In the example embodiment, collaboration device 120 desires to pair with a collaboration client device 130; however, any collaboration devices may be paired in substantially the same manner described below. For example, a collaboration client device 130 may desire to pair with another collaboration client device 130 and/or collaboration device 120 and perform these operations.

At operation 605, collaboration device 120 stores a set of data eigenvectors that are based on a Prometheus Orthonormal Set (PONS) code construction and orthogonal to each other, wherein each of the data eigenvectors is mapped to a unique multi-bit word. At operation 610, collaboration device 120 generates a pilot sequence representing a selected pilot eigenvector that is also based on the PONS construction and orthogonal to each of the data eigenvectors.

At operation 615, collaboration device 120 groups input data into multi-bit words and selects ones of the data eigenvectors mapped to the multi-bit words. The input data may include multi-bit tokens from collaboration server 110. The multi-bit tokens may include a sequence of bits including data bits for verification data and one or more cyclic redundancy check (CRC) or other error detect/correct bits. At operation 620, collaboration device 120 generates a spread data sequence including the selected ones of the data eigenvectors and that is synchronized to the pilot sequence. At operation 625, collaboration device 120 generates an acoustic signal including the synchronized pilot sequence and the spread data sequence. The collaboration client device records start and stop times for the pilot sequence and the data frames.

At operation 630, collaboration device 120 transmits the acoustic signal through speaker 306 (FIG. 3), and may generate and record one or more transmit times for the transmitted acoustic signal. The one or more transmit times may include the recorded start and stop times for the pilot sequence and the data frames.

Figure 7:
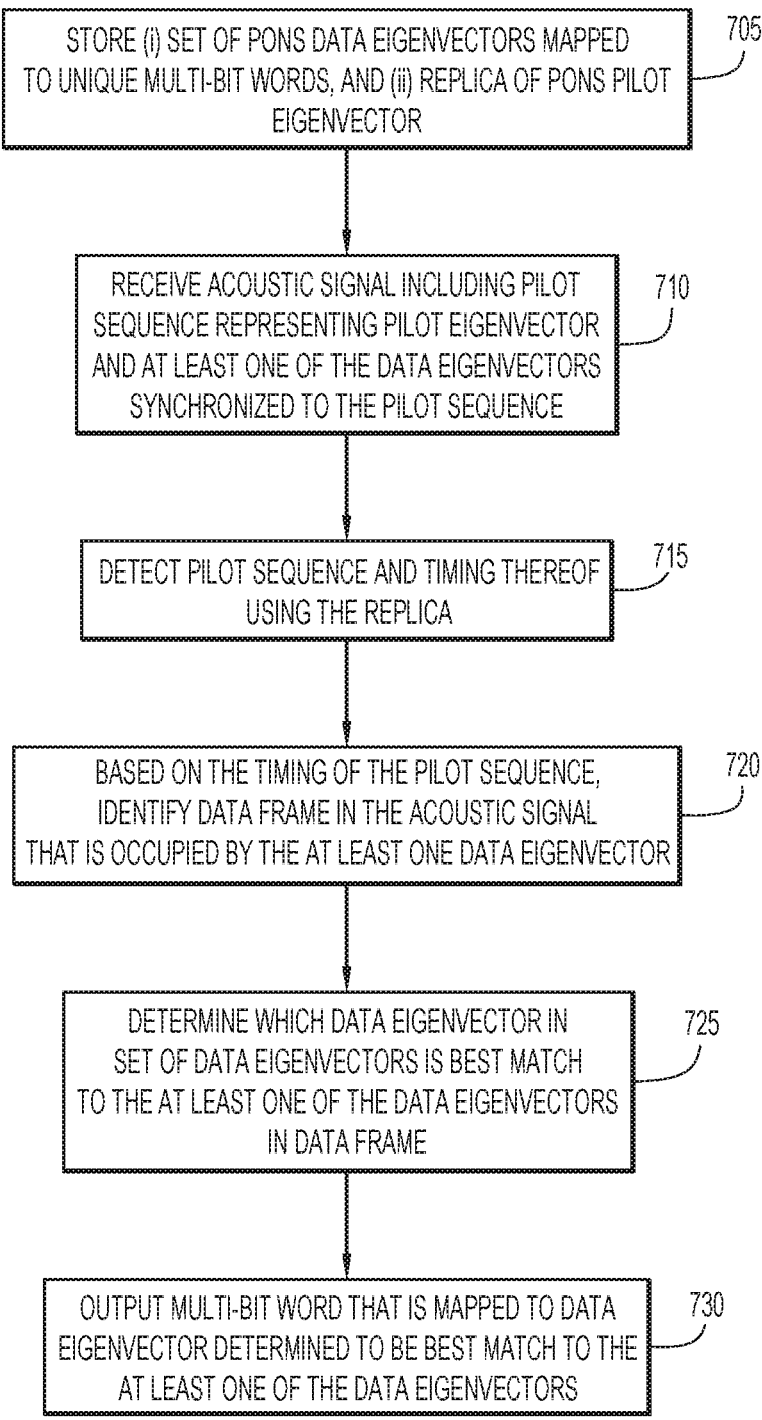
FIG. 7 is a flowchart of a method of decoding a spread spectrum signal, according to an example embodiment.

With continued reference to FIG. 1, FIG. 7 illustrates a flowchart of a method 700 of decoding a spread spectrum signal, according to an example embodiment. While the operations of FIG. 7 are described as being performed by a collaboration client device 130, it will be appreciated that other components of system 100 may additionally/alternatively perform any of these operations. In the example embodiment, a collaboration device 120 desires to pair with a collaboration client device 130; however, any collaboration devices may be paired in substantially the same manner described below. For example, collaboration device 120 may serve as a client device for pairing with a collaboration client device 130 and perform these operations.

At operation 705, collaboration client device 130 stores (i) a set of data eigenvectors that are based on the Prometheus Orthonormal Set (PONS) code construction and orthogonal to each other, wherein each of the data eigenvectors is mapped to a unique multi-bit word, and (ii) a replica of a pilot eigenvector that is also based on the PONS and is orthogonal to each of the data eigenvectors.

At operation 710, collaboration client device 130 receives a transmitted acoustic spread spectrum signal including a pilot sequence representing the pilot eigenvector and at least one of the data eigenvectors synchronized to the pilot sequence. At operation 715, collaboration client device 130 detects the pilot sequence and its associated timing using the replica. At operation 720, collaboration client device 130 identifies a data frame in the acoustic spread spectrum signal that is occupied by the at least one data eigenvector based on the timing of the detected pilot sequence. The collaboration client device also records times of the detected pilot sequence, autocorrelation peak, and the data frame.

At operation 725, collaboration client device 130 determines which data eigenvector in the set of data eigenvectors is a best match to the at least one of the data eigenvectors in the data frame. At operation 730, the collaboration client device outputs the multi-bit word that is mapped to the data eigenvector determined to be the best match to the at least one of the data eigenvectors. The multi-bit word is basically the token encoded in the spread spectrum signal which may include a sequence of bits including data bits for verification data and one or more cyclic redundancy check (CRC) or other error detect/correct bits.

Collaboration server 110 communicates with each of collaboration device 120 and a collaboration client device 130 over network 150, while collaboration device 120 and collaboration client device 130 may communicate with each other over one or more communication channels when paired. Collaboration server 110 generates and sends tokens to collaboration device 120 over network 150 to be transmitted to collaboration client device 130 for verification. The pairing of collaboration client device 130 with collaboration device 120 may be performed as described above when collaboration client device 130 is not connected to, or paired with, an accessory device 140. However, this type of pairing is inoperable when a headset or other accessory device (e.g., a portable speakerphone, etc.) is already connected to, or paired with, the collaboration client device.

Figure 8:
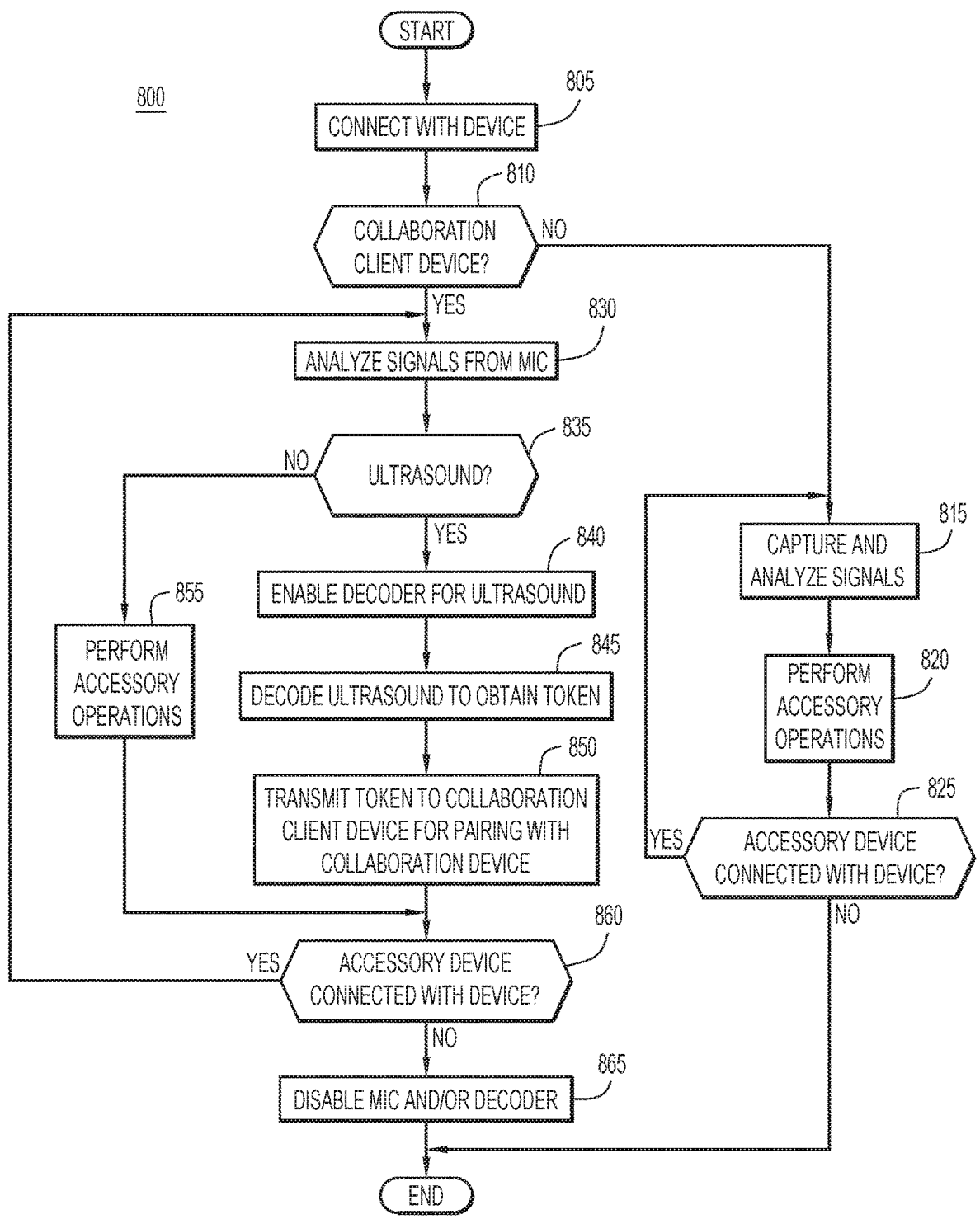
FIG. 8 illustrates a flowchart of a method for detecting and processing acoustic signals for pairing collaboration devices, according to an example embodiment.

Accordingly, a present embodiment performs ultrasound pairing of collaboration devices through an accessory device (e.g., headsets, personal speakerphone, etc.). With continued reference to FIG. 1, FIG. 8 illustrates a flowchart of an example method 800 for detecting and decoding an acoustic signal for pairing collaboration devices. While the operations of FIG. 8 are described as being performed by an accessory device 140, it will be appreciated that any quantity of accessory devices of corresponding collaboration client devices may perform these operations for pairing. It will be further appreciated that other components of system 100 may additionally/alternatively perform any of these operations. In the example method, collaboration device 120 desires to pair with a collaboration client device 130; however, any collaboration devices may be paired in substantially the same manner described below. For example, a collaboration client device 130 may desire to pair with another collaboration client device 130 and/or collaboration device 120.

At operation 805, accessory device 140 connects with a device for exchanging information and/or providing output from the device. The accessory device may be connected with the device by establishing a wired or wireless connection or communication path between the accessory device and the device for exchange of information (e.g., Bluetooth (BT) pairing or other wireless communication medium/protocol, Universal Serial Bus (USB) or other wired communication medium/protocol, etc.). Further, the accessory device may exchange device identification or other information (e.g., flag, indicator, etc.) during the connection process or within other communications in order to identify a device as a collaboration client device 130. Alternatively, collaboration client device 130 may provide an indication (e.g., flag, indicator, etc.) to accessory device 140 to enable ultrasound verification.

When the connected device is not a collaboration client device 130 as determined at operation 810 (e.g., accessory device 140 connects or pairs with another type of device), the accessory device captures and analyzes audio and/or other signals (e.g., captured by a microphone 308 (FIG. 3), an image capture device 314 (FIG. 3), etc.) at operation 815. The microphone may be configured for detecting voice or other audio signals (e.g., voice, audio, for noise cancellation, etc.). The accessory device performs typical accessory operations (e.g., provide audio/video output from the paired device, capture and provide audio/video information to the paired device, noise cancellation, etc.) at operation 820. The process repeats until the accessory device disconnects from the device at operation 825.

Collaboration server 110 generates and sends a token to collaboration device 120 over communication network 150, where collaboration device 120 encodes the token on an acoustic or other signal and transmits the acoustic signal over speaker 306 (FIG. 3). The token typically includes a sequence of bits including data bits and one or more cyclic redundancy check (CRC) bits. In an example embodiment, the acoustic signal is preferably an ultrasound signal that is generated using spread spectrum techniques as described above. The acoustic signal preferably has a frequency of approximately 22 kilohertz (kHz), and preferably in the frequency range of 20-24 kilohertz (kHz). However, any desired frequency and encoding (e.g., modulation, etc.) may be employed, preferably outside the range of human hearing (e.g., at least 20 kilohertz (kHz)).

When the connected device is a collaboration client device 130 as determined at operation 810, the accessory device analyzes audio signals captured by microphone 162 to determine the presence of the ultrasound signal at operation 830. The ultrasound signal may be detected via any conventional or other techniques (e.g., based on a frequency range, etc.), and may be digitized by microphone 162 and/or other components (e.g., decoder 164, etc.) for processing. Microphone 162 may be configured for capturing/detecting ultrasound signals, and may further capture voice or other audio signals (e.g., voice, audio, for noise cancellation, etc.). When the ultrasound signal is not present as determined at operation 835, the accessory device performs typical accessory operations (e.g., provide audio/video output from the paired device, capture and provide audio/video information to the paired device, noise cancellation, etc.) at operation 855.

When the ultrasound signal is detected as determined at operation 835, the accessory device may enable decoder 164 (and/or other audio system components) for detection and processing of ultrasound signals at operation 840. Accordingly, the operation of audio system 142 (e.g., always-on microphone 162 and decoder 164) may be controlled separately from activity on device interface driver 144 in order to conserve power, especially for portable or battery operated devices.

In an example embodiment, microphone 162 may include a digital Micro-Electro-Mechanical Systems (MEMS) microphone. Microphone 162 may send an interrupt when an ultrasound signal is detected to awaken the decoder (and/or other audio system components) from a sleep state to process the ultrasound signal. In yet another example embodiment, audio from microphone 162 may be spooled or stored for corresponding time intervals, where the decoder (and/or other audio system components) may wake up periodically (e.g., upon expiration of a time interval, etc.) to process the spooled audio (e.g., spooled/stored during the expired time interval, up to the point of awakening, etc.) based on the accessory device waking up to stay connected (e.g., for Bluetooth (BT) connections, etc.). The time intervals may be for any desired durations (e.g., microseconds, milliseconds, seconds, minutes, etc.). In still another example, a user may manually trigger the listening process of microphone 162 for detecting the ultrasound signal (e.g., by the touch of a button, a voice command, etc.)

The ultrasound signal is decoded by decoder 164 to obtain the token at operation 845. The decoding of the ultrasound signal may be performed using any conventional or other spread spectrum decoding techniques compatible with the spread spectrum encoding (e.g., decoding techniques for Direct Sequence Spread Spectrum (DSSS), decoding techniques for Frequency Hopping Spread Spectrum (FHSS), decoding techniques for hybrid spread spectrum (HSS) techniques combining direct sequence, frequency hopping, and/or other techniques, etc.). For example, the ultrasound signal may be decoded as described above with respect to FIG. 7.

At operation 850, device interface driver 144 transmits the token from the ultrasound signal to collaboration client device 130. Accordingly, the accessory device preferably passes data (e.g., the extracted token, etc.) to the collaboration client device, instead of passing the ultrasound signal. The device interface driver may send the token to the collaboration client device using any conventional or other communication media and protocols (e.g., Bluetooth (BT), Universal Serial Bus (USB), Near Field Communication (NFC), etc.). The token may be transmitted using any desired command compatible with the connection (e.g., via a USB human interface device (HID) command, a BT human interface device (HID) command, etc.). The connection or communication path may be the same connection used to connect the accessory device to the collaboration client device. Alternatively, a different connection may be used to pass the extracted token that may be any wired or wireless communication medium/protocol, and preferably out of band (to not interfere) with the communication channel for media.

The token is sent from the collaboration client device over communication network 150 to collaboration server 110 for validation and pairing of collaboration client device 130 with collaboration device 120. The above process repeats (from analyzing signals from microphone 162 at operation 830) until accessory device 140 disconnects from collaboration client device 130 as determined at operation 860. When the accessory device disconnects from the collaboration client device, accessory device 140 may disable decoder 164 (and/or other audio system components) for ultrasound detection and processing (e.g., direct the components to enter a sleep state, etc.) at operation 865 in order to conserve power.

Figure 9:
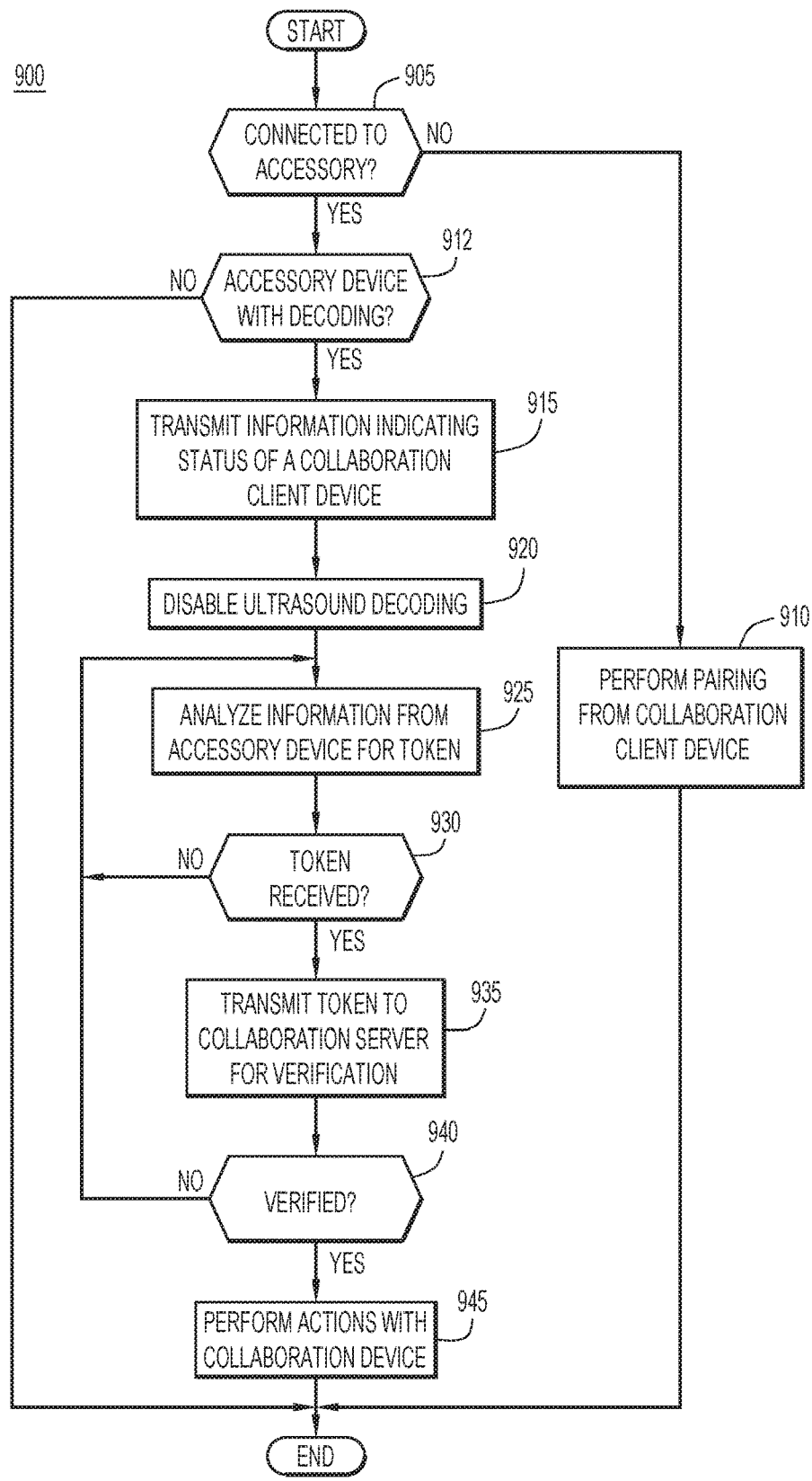
FIG. 9 illustrates a flowchart of a method for performing pairing of collaboration devices through an accessory device, according to an example embodiment.

With continued reference to FIG. 1, FIG. 9 illustrates a flowchart of an example method 900 for pairing collaboration devices. While the operations of FIG. 9 are described as being performed by a collaboration client device 130, it will be appreciated that any quantity of collaboration client devices may perform these operations. It will be further appreciated that other components of system 100 may additionally/alternatively perform any of these operations. In the method, collaboration device 120 desires to pair with a collaboration client device 130; however, any collaboration devices may be paired in substantially the same manner described below. For example, a collaboration client device 130 may desire to pair with another collaboration client device 130 and/or collaboration device 120.

Initially, collaboration server 110 generates and sends a token to collaboration device 120 over communication network 150, where collaboration device 120 encodes the token on an acoustic or other signal and transmits the acoustic signal over speaker 306 (FIG. 3). The token is typically a sequence of bits including data bits and one or more cyclic redundancy check (CRC) bits. In an example embodiment, the acoustic signal is preferably an ultrasound signal that is generated using spread spectrum techniques as described above. The acoustic signal preferably has a frequency of approximately 22 kilohertz (kHz), and preferably in the frequency range of 20-24 kilohertz (kHz). However, any desired frequency and encoding (e.g., modulation, etc.) may be employed, preferably outside the range of human hearing (e.g., at least 20 kilohertz (kHz)).

At operation 905, collaboration module 134 determines whether collaboration client device 130 is connected to, or paired with, an accessory. When collaboration client device 130 is not connected with an accessory, pairing of collaboration client device 130 with collaboration device 120 is performed at operation 910 in substantially the same manner described above for FIG. 5.

When collaboration client device 130 is connected to, or paired with, an accessory as determined at operation 905, collaboration module 134 determines whether the accessory is an accessory device 140 (e.g., with capability to decode an ultrasound signal). An accessory device 140 may exchange device identification or other information (e.g., flag, indicator, etc.) during the connection process or within other communications with collaboration client device 130 in order to identify the accessory device as an accessory device 140 (e.g., with ultrasound decoding capability). Alternatively, accessory device 140 may provide an indication (e.g., flag, indicator, etc.) to collaboration client device 130 to disable ultrasound detection and processing. For example, the indication may direct collaboration module 134 to examine information from host interface driver 132 to detect and obtain the token, rather than detecting and processing an ultrasound signal from a microphone or other audio sensing device.

When collaboration client device 130 is connected to, or paired with, an accessory that is not an accessory device 140 (e.g., with ultrasound detection capability) as determined at operation 912, the process terminates (e.g., since the pairing may not be performed in this scenario as described above).

However, when collaboration client device 130 is connected to, or paired with, an accessory device 140 as determined at operation 912, the collaboration client device may transmit information indicating a status as a collaboration client device to the accessory device at operation 915. This basically informs the accessory device that collaboration module 134 is present for pairing, and that decoder 164 (and/or other audio system components for ultrasound detection and processing) of the accessory device should be enabled. At operation 920, collaboration module 134 may disable ultrasound decoding and processing on the collaboration client device since the ultrasound detection and decoding is being performed by accessory device 140. For example, when collaboration client device 130 is connected to, or paired, with accessory device 140, collaboration module 134 may adjust processing to examine information from host interface driver 132 to detect and obtain the token, rather than detecting and processing an ultrasound signal from a microphone or other audio sensing device.

At operation 925, collaboration module 134 analyzes information received from accessory device 140 through host interface driver 132. The host interface driver may exchange information with device interface driver 144 of collaboration client device 130 using any conventional or other communication media and protocols (e.g., Bluetooth (BT), Universal Serial Bus (USB), Near Field Communication (NFC), etc.). The connection or communication path may be the same connection used to connect the accessory device to the collaboration client device. Alternatively, a different connection may be used to pass the extracted token that may be any wired or wireless communication medium/ protocol, and preferably out of band (to not interfere) with the communication channel for media.

When a token is not present within the information as determined at operation 930, additional information is received and analyzed for the presence of a token at operation 925.

When a token is received as determined at operation 930, collaboration module 134 transmits the token to collaboration server 110 over communication network 150 for validation at operation 935. In an example embodiment, the collaboration server may compare the received token to the token provided to collaboration device 120 as described above. When the tokens match, the collaboration client device is considered verified or authenticated for collaboration device 120.

Collaboration server 110 may provide results of the verification and collaboration information to collaboration client device 130 over communication network 150. When collaboration client device 130 is not verified as determined at operation 940, additional information may be received from accessory device 140 and analyzed for the presence of a token at operation 925 as described above.

When collaboration client device 130 is verified as determined at operation 940, collaboration client device 130 is considered to be in proximity of, and paired with, collaboration device 120, and may perform various actions with collaboration device 120 at operation 945. In other words, once the token is validated by collaboration server 110, collaboration client device 130 is now considered to be in proximity with collaboration device 120 and can execute functions and controls, etc. A direct communication channel is not needed and is optional. Collaboration client device 130 and collaboration device 120 can now communicate and control each other as collaboration server 110 has declared them to be in proximity and will allow communication between these devices.

Figure 10:
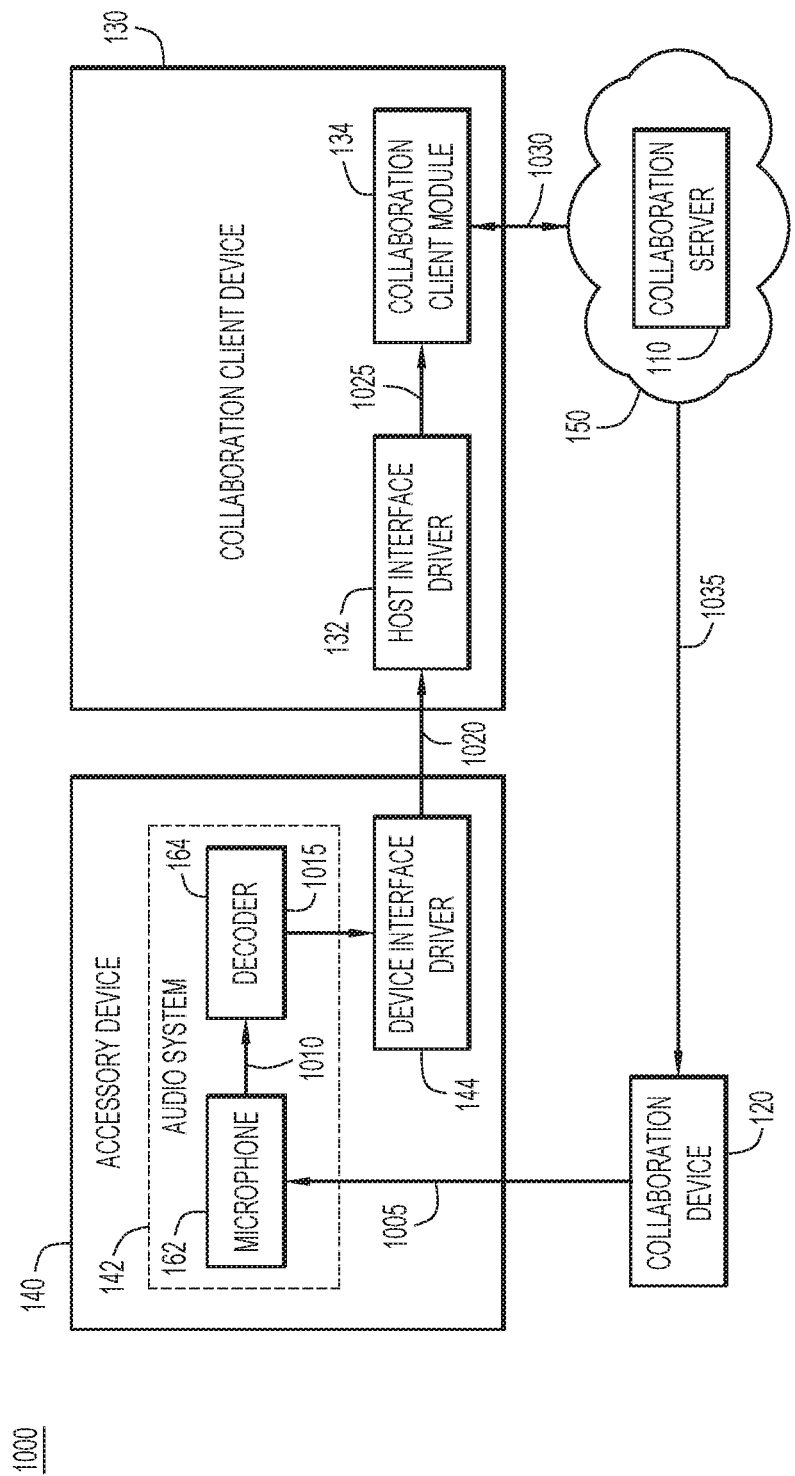
FIG. 10 illustrates a flow diagram of pairing collaboration devices through an accessory device, according to an example embodiment.

With continued reference to FIG. 1, FIG. 10 illustrates a flow diagram of an example method 1000 for pairing collaboration devices through an accessory device. It will be appreciated that other components of system 100 may additionally/alternatively perform any of these operations. In the example method, collaboration device 120 desires to pair with a collaboration client device 130; however, any collaboration devices may be paired in substantially the same manner described below. For example, a collaboration client device 130 may desire to pair with another collaboration client device 130 and/or collaboration device 120.

At operation 1005, collaboration device 120 receives a token from collaboration server 110, and encodes the token on an acoustic or other signal. The token typically includes a sequence of bits including data bits and one or more cyclic redundancy check (CRC) bits. The acoustic signal is broadcasted from speaker 306 (FIG. 3) of collaboration device 120 as described above. In an example embodiment, the acoustic signal is an ultrasound signal that is generated using spread spectrum techniques as described above. The acoustic signal preferably has a frequency of approximately 22 kilohertz (kHz), and preferably in the frequency range of 20-24 kilohertz (kHz). However, any desired frequency and encoding (e.g., modulation, etc.) may be employed, preferably outside the range of human hearing (e.g., at least 20 kilohertz (kHz)). The spread spectrum signal may be generated from any conventional or other spread spectrum technique (e.g., Direct Sequence Spread Spectrum (DSSS), Frequency Hopping Spread Spectrum (FHSS), hybrid spread spectrum (HSS) techniques combining direct sequence, frequency hopping, and/or other techniques, etc.).

For example, the spread spectrum signal representing/encoded with the token may be generated as described above with respect to FIG. 6.

At operation 1010, microphone 162 of accessory device 140 (connected to, or paired with, collaboration client device 130) detects the ultrasound signal and awakens decoder 164 (and/or other audio system components) for ultrasound processing. At operation 1015, decoder 164 decodes the ultrasound signal to obtain the token, and provides the token to device interface driver 144 as described above. The spread spectrum signal may be decoded using any conventional or other spread spectrum decoding techniques (e.g., decoding techniques for Direct Sequence Spread Spectrum (DSSS), decoding techniques for Frequency Hopping Spread Spectrum (FHSS), decoding techniques for hybrid spread spectrum (HSS) techniques combining direct sequence, frequency hopping, and/or other techniques, etc.). For example, the spread spectrum signal may be decoded as described above with respect to FIG. 7.

Device interface driver 144 of accessory device 140 sends the token over a communication connection to collaboration client device 130 at operation 1020. Accordingly, the accessory device preferably passes data (e.g., the extracted token, etc.) to the collaboration client device, instead of passing the ultrasound signal. The device interface driver may send the token to the collaboration client device using any conventional or other communication media and protocols (e.g., Bluetooth (BT), Universal Serial Bus (USB), Near Field Communication (NFC), etc.). The token may be sent using any desired command compatible with the connection (e.g., a USB human interface device (HID) command, a BT human interface device (HID) command, etc.). The connection or communication path may be the same connection used to connect the accessory device to the collaboration client device. Alternatively, a different connection may be used to pass the extracted token that may be any wired or wireless communication medium/protocol, and preferably out of band (to not interfere) with the communication channel for media.

At operation 1025, host interface driver 132 of collaboration client device 130 receives the token, and sends the token to collaboration module 134. The host interface driver may exchange information with device interface driver 144 of accessory device 140 using any conventional or other communication media and protocols (e.g., Bluetooth (BT), Universal Serial Bus (USB), Near Field Communication (NFC), etc.). The connection or communication path may be the same connection used to connect the accessory device to the collaboration client device. Alternatively, a different connection may be used to pass the extracted token that may be any wired or wireless communication medium/protocol, and preferably out of band (to not interfere) with the communication channel for media.

At operation 1030, collaboration module 134 of collaboration client device 130 sends the token over communication network 150 to collaboration server 110 for verification of collaboration client device 130 and to receive collaboration information. In an example embodiment, the collaboration server may compare the received token to the token provided to collaboration device 120 as described above. When the tokens match, the collaboration client device is considered verified for collaboration device 120 at operation 1035.

Once collaboration client device 130 is verified, the collaboration client device may perform various actions with collaboration device 120 as described above.

Figure 11:
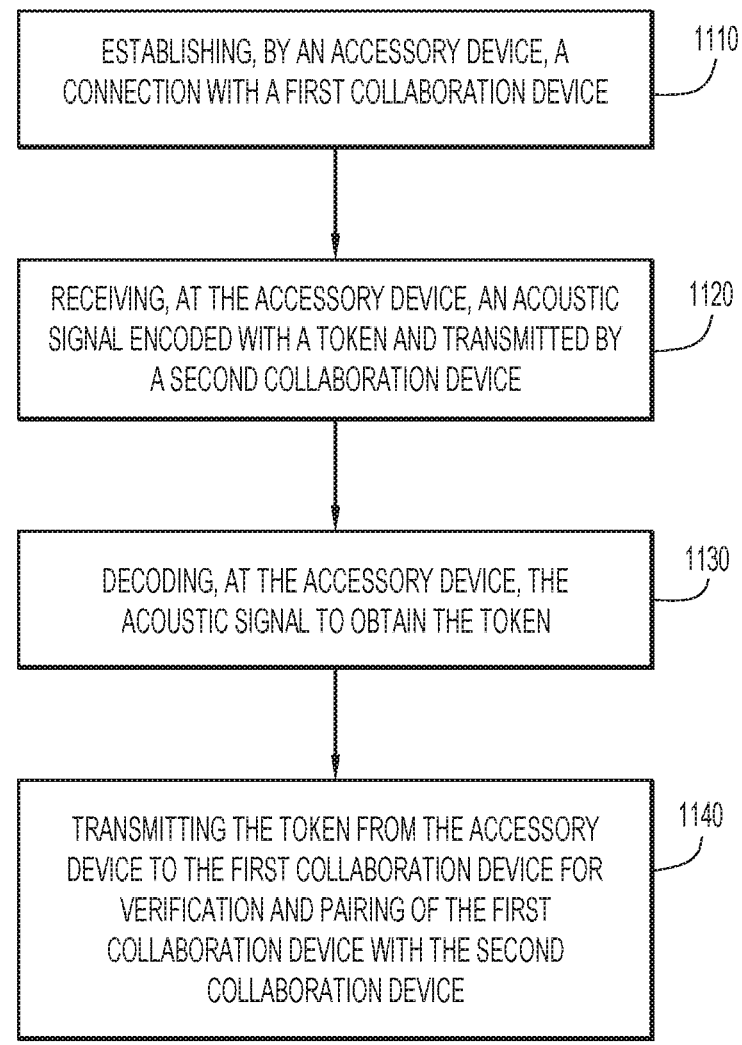
FIG. 11 illustrates a flowchart of a generalized method for pairing collaboration devices through an accessory device, according to an example embodiment.

FIG. 11 is a flowchart of an example method 1100 for electronic device pairing through an accessory device. At operation 1110, an accessory device establishes a connection with a first collaboration device. At operation 1120, an acoustic signal encoded with a token and transmitted by a second collaboration device is received at the accessory device. At operation 1130, the acoustic signal is decoded at the accessory device to obtain the token. At operation 1140, the token is transmitted from the accessory device to the first collaboration device for verification and pairing of the first collaboration device with the second collaboration device.

The programs and software described herein (e.g., host interface driver 132, collaboration module 134, device interface driver 144, etc.) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments (e.g., host interface driver 132, collaboration module 134, device interface driver 144, etc.) may be implemented in any desired computer language and could be developed by one of ordinary skill in the computer arts based on the functional descriptions contained in the specification and flow charts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing systems, and/or any other intermediary processing devices. The software and/or algorithms described above and illustrated in the flow charts and diagrams may be modified in any manner that accomplishes the functions described herein. In addition, the functions in the flow charts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes memory element(s) and/or storage being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly be connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Any Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: establishing, by an accessory device, a connection with a first collaboration device; receiving, at the accessory device, an acoustic signal encoded with a token and transmitted by a second collaboration device; decoding, at the accessory device, the acoustic signal to obtain the token; and transmitting the token from the accessory device to the first collaboration device for verification and pairing of the first collaboration device with the second collaboration device.

In one example, the acoustic signal includes an ultrasound signal.

In one example, the ultrasound signal includes a spread spectrum signal.

In one example, receiving the acoustic signal includes: receiving the acoustic signal at the accessory device via an always-on audio sensing device.

In one example, decoding the acoustic signal includes: awakening a decoder of the accessory device from a sleep state in response to detecting the acoustic signal at the accessory device, wherein the decoder decodes the acoustic signal to obtain the token.

In one example, decoding the acoustic signal includes: storing acoustic signals received via an audio sensing device of the accessory device for corresponding time intervals; and periodically awakening a decoder of the accessory device upon expiration of a time interval to decode the stored acoustic signals from the expired time interval to obtain the token.

In one example, the accessory device includes a headset.

In another form, an apparatus is provided. The apparatus comprises: an accessory device including one or more processors configured to: establish a connection with a first collaboration device; receive an acoustic signal encoded with a token and transmitted by a second collaboration device; decode the acoustic signal to obtain the token; and transmit the token to the first collaboration device for verification and pairing of the first collaboration device with the second collaboration device.

In another form, one or more non-transitory computer readable storage media are provided. The non-transitory computer readable storage media are encoded with processing instructions that, when executed by a processor of an accessory device, cause the processor to: establish a connection with a first collaboration device; receive an acoustic signal encoded with a token and transmitted by a second collaboration device; decode the acoustic signal to obtain the token; and transmit the token to the first collaboration device for verification and pairing of the first collaboration device with the second collaboration device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   establishing, by an accessory device, a connection with a first collaboration device of a first user, wherein the accessory device exchanges one or more of audio and video with the first collaboration device, and wherein the accessory device informs the first collaboration device to disable processing of acoustic signals for pairing on the first collaboration device based on establishing the connection;
   receiving, at the accessory device, an acoustic signal encoded with a token and transmitted by a second collaboration device of a second user to pair with the first collaboration device for a collaboration session including the first and second users;
   decoding, at the accessory device, the acoustic signal to obtain the token; and
   transmitting the token from the accessory device to the first collaboration device for verifying the first collaboration device and pairing the first collaboration device with the second collaboration device for the collaboration session.

2. The method of claim 1, wherein the acoustic signal includes an ultrasound signal.

3. The method of claim 2, wherein the ultrasound signal includes a spread spectrum signal.

4. The method of claim 1, wherein receiving the acoustic signal includes:
   receiving the acoustic signal at the accessory device via an always-on audio sensing device.

5. The method of claim 4, wherein decoding the acoustic signal includes:
   awakening a decoder of the accessory device from a sleep state in response to detecting the acoustic signal at the accessory device, wherein the decoder decodes the acoustic signal to obtain the token.

6. The method of claim 1, wherein decoding the acoustic signal includes:
   storing acoustic signals received via an audio sensing device of the accessory device for corresponding time intervals; and
   periodically awakening a decoder of the accessory device upon expiration of a time interval to decode stored acoustic signals from the time interval to obtain the token.

7. The method of claim 1, wherein the accessory device includes a headset.

8. An apparatus comprising:
   an accessory device including one or more processors configured to:
      establish a connection with a first collaboration device of a first user, wherein the accessory device exchanges one or more of audio and video with the first collaboration device, and wherein the accessory device informs the first collaboration device to disable processing of acoustic signals for pairing on the first collaboration device based on establishing the connection;
      receive an acoustic signal encoded with a token and transmitted by a second collaboration device of a second user to pair with the first collaboration device for a collaboration session including the first and second users;
      decode the acoustic signal to obtain the token; and
      transmit the token to the first collaboration device for verifying the first collaboration device and pairing the first collaboration device with the second collaboration device for the collaboration session.

9. The apparatus of claim 8, wherein the acoustic signal includes an ultrasound signal.

10. The apparatus of claim 9, wherein the ultrasound signal includes a spread spectrum signal.

11. The apparatus of claim 8, wherein the one or more processors are further configured to:
    receive the acoustic signal at the accessory device via an always-on audio sensing device.

12. The apparatus of claim 11, wherein the one or more processors are further configured to:
    awaken a decoder of the accessory device from a sleep state in response to detecting the acoustic signal at the accessory device, wherein the decoder decodes the acoustic signal to obtain the token.

13. The apparatus of claim 8, wherein the one or more processors are further configured to:
    store acoustic signals received via an audio sensing device of the accessory device for corresponding time intervals; and
    periodically awaken a decoder of the accessory device upon expiration of a time interval to decode the stored acoustic signals from expiration of the time interval to obtain the token.

14. The apparatus of claim 8, wherein the accessory device includes a headset.

15. One or more non-transitory computer readable storage media encoded with processing instructions that, when executed by a processor of an accessory device, cause the processor to:
- establish a connection with a first collaboration device of a first user, wherein the accessory device exchanges one or more of audio and video with the first collaboration device, and wherein the accessory device informs the first collaboration device to disable processing of acoustic signals for pairing on the first collaboration device based on establishing the connection;
- receive an acoustic signal encoded with a token and transmitted by a second collaboration device of a second user to pair with the first collaboration device for a collaboration session including the first and second users;
- decode the acoustic signal to obtain the token; and
- transmit the token to the first collaboration device for verifying the first collaboration device and pairing the first collaboration device with the second collaboration device for the collaboration session.

16. The one or more non-transitory computer readable storage media of claim 15, wherein the acoustic signal includes an ultrasound signal.

17. The one or more non-transitory computer readable storage media of claim 16, wherein the ultrasound signal includes a spread spectrum signal.

18. The one or more non-transitory computer readable storage media of claim 15, wherein the processing instructions further cause the processor to:
- receive the acoustic signal via an always-on audio sensing device.

19. The one or more non-transitory computer readable storage media of claim 18, wherein the processing instructions further cause the processor to:
- awaken a decoder of the accessory device from a sleep state in response to detecting the acoustic signal, wherein the decoder decodes the acoustic signal to obtain the token.

20. The one or more non-transitory computer readable storage media of claim 15, wherein the processing instructions further cause the processor to:
- store acoustic signals received via an audio sensing device of the accessory device for corresponding time intervals; and
- periodically awaken a decoder of the accessory device upon expiration of a time interval to decode the stored acoustic signals from expiration of the time interval to obtain the token.

* * * * *

UNITED STATES PATENT AND TRADEMARK OFFICE
CERTIFICATE OF CORRECTION

| | |
|---|---|
| PATENT NO. | : 11,695,484 B2 |
| APPLICATION NO. | : 17/081503 |
| DATED | : July 4, 2023 |
| INVENTOR(S) | : Catelyn G. Orsini et al. |

It is certified that error appears in the above-identified patent and that said Letters Patent is hereby corrected as shown below:

In the Claims

Claim 13, Column 24, Line 64, please replace "signals from expiration of the time interval to" with --signals from the time interval to--

Claim 20, Column 26, Line 23, please replace "signals from expiration of the time interval to" with --signals from the time interval to--

Signed and Sealed this
Twelfth Day of September, 2023

Katherine Kelly Vidal
*Director of the United States Patent and Trademark Office*